July 7, 1931.     G. M. RAMSEY     1,813,816
GRIP TESTING MACHINE
Filed Dec. 26, 1928     3 Sheets-Sheet 1

George Monroe Ramsey
INVENTOR
BY Victor J. Evans
ATTORNEY

July 7, 1931.  G. M. RAMSEY  1,813,816
GRIP TESTING MACHINE
Filed Dec. 26, 1928  3 Sheets-Sheet 2

George Monroe Ramsey
INVENTOR
BY Victor J. Evans
ATTORNEY

July 7, 1931.   G. M. RAMSEY   1,813,816
GRIP TESTING MACHINE
Filed Dec. 26, 1928   3 Sheets-Sheet 3
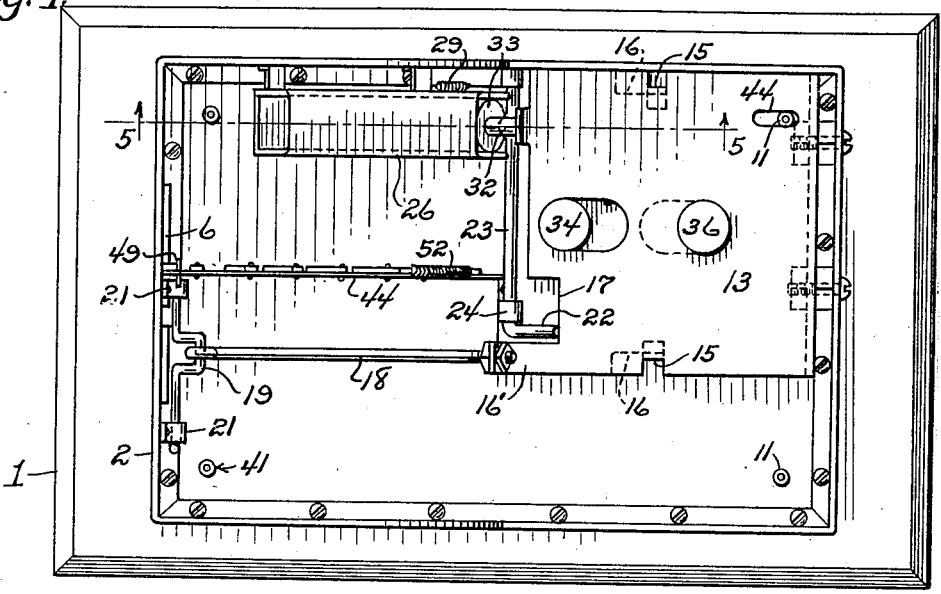
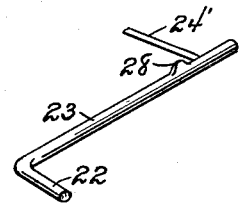
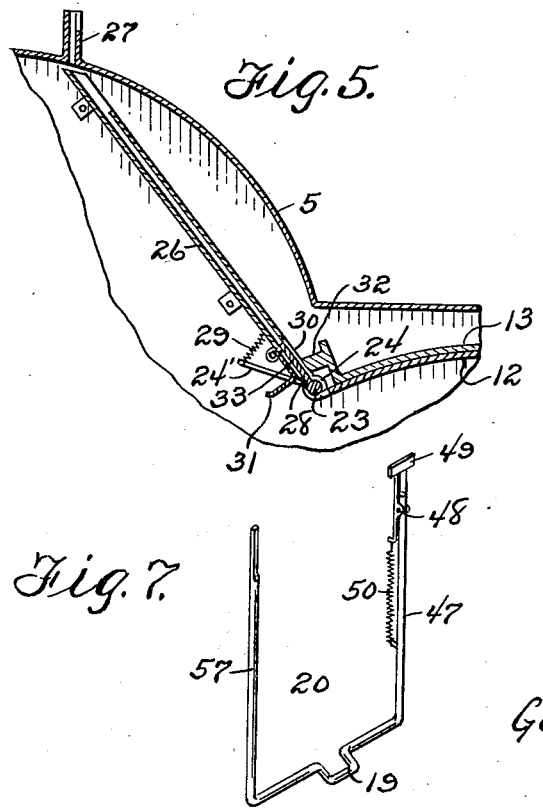
George Monroe Ramsey
INVENTOR
BY Victor J. Evans
ATTORNEY Patented July 7, 1931

1,813,816

UNITED STATES PATENT OFFICE

GEORGE MONROE RAMSEY, OF AMARILLO, TEXAS

GRIP TESTING MACHINE

Application filed December 26, 1928. Serial No. 328,404.

My present invention has reference to a machine whereby the grip of a human hand may be accurately tested and registered.

A further object is the provision of a device of this character which is small in size so that the same can be readily arranged upon the counter of a store, and which not only indicates upon a register the exact gripping power of the user but gives audible indication thereof.

For a full and comprehensive understanding of the invention, reference is to be had to the drawings which accompany and form part of this application.

In the drawings:

Figure 4 is a detail plan view of the crank member that carries the indicator hand or finger as well as the tappet which causes the audible alarm.

Figure 5 is a detail sectional view approximately on the line 5—5 of Figure 4.

Figure 6 is a detail perspective view of the trip.

Figure 7 is a similar view of the cranked U-shaped member or bail that carries on one of its arms the spring influenced detent or trip and has removably associated with its second arm the indicator finger.

Figure 8 is a similar view of the indicator finger.

Figure 1:
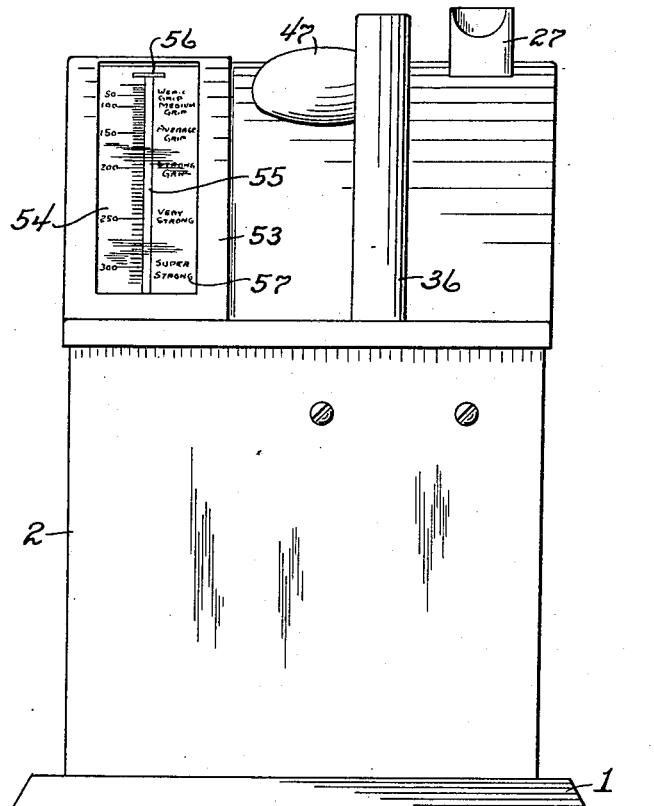
Figure 1 is a front elevation of the improvement.
Figure 2:
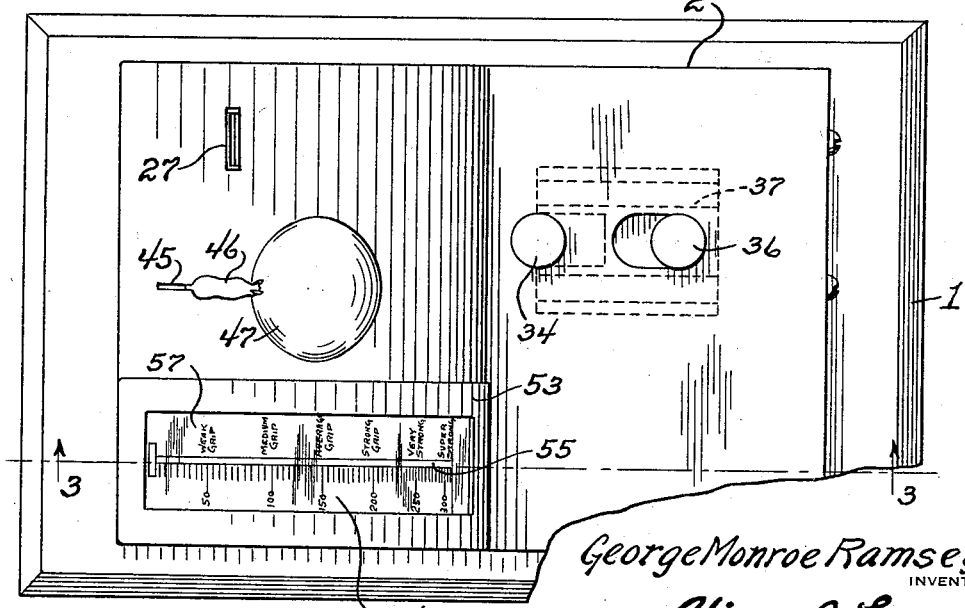
Figure 2 is a top plan view thereof.
Figure 3:
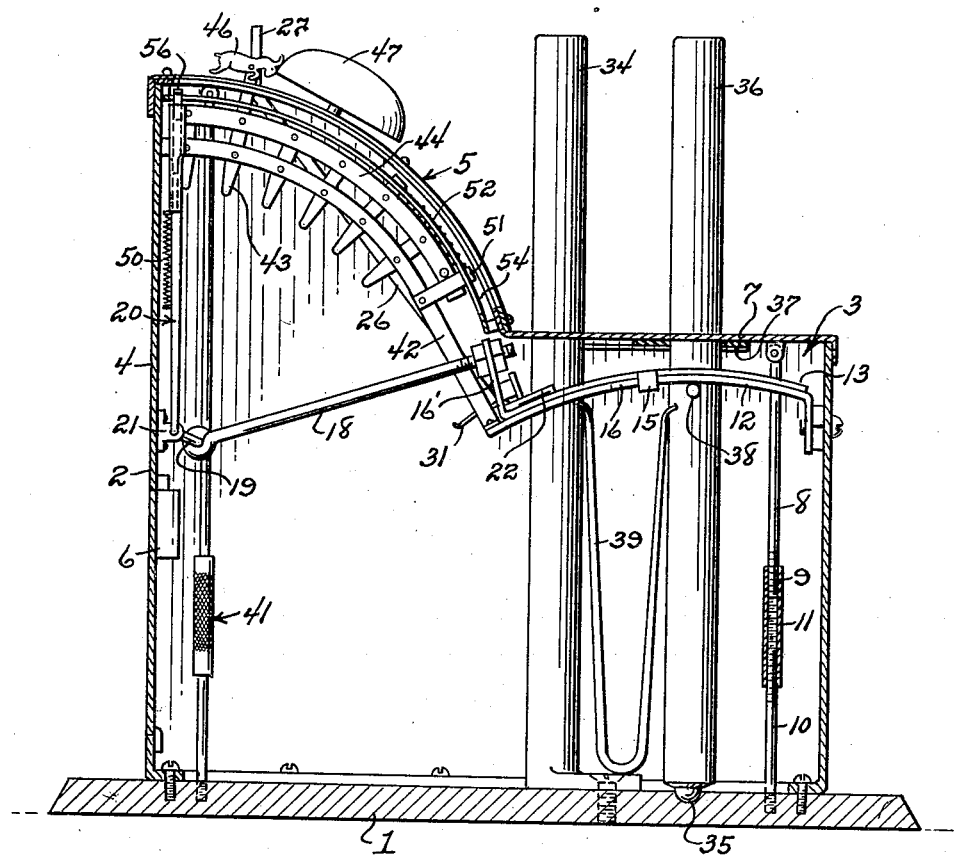
Figure 3 is a sectional view approximately on the line 3—3 of Figure 2.

The improvement is preferably wholly constructed of metal and includes a flat rectangular base 1 from which arises a casing 2. As disclosed by Figure 3 of the drawings, the casing has its inner edges flanged and these flanges are screwed to the base. As disclosed by Figures 1, 2, 3 and 5, the front of the casing is of substantially rectangular formation and is indicated for distinction by the numeral 3. From its flat top the casing is rounded or arched upwardly to its rear plate 4. The top proper, indicated for distinction by the numeral 5, is preferably removably connected with the arched or rounded edges of the rear portions of the casing, and the flat back or rear of the casing has an opening therethrough which is normally closed by a locked door 6.

To establish a brace between the top of what I will term the front 7 of the casing and the base 1, I pivotally secure on the inner face of the said top 7, rods 8 that have one of their ends provided with threads 9, and I screw into the base second rods 10 that have their ends oppositely threaded. The different hand thread pitches on the rods are engaged by a turn buckle 11.

Secured in the face of the front 7 there is the straight end of an arcuate curved plate 12 which is also preferably secured to one of the sides of the said front portion 7 and overlying and slidably movable upon the arched or curved plate 12 there is a second similarly shaped plate 13. One of the rods 8 passes through elongated openings 14 in the lapping curved or arched plates 12 and 13, and the upper plate 13 preferably has its edges, at determined intervals notched and formed with depending fingers 15 to be received in somewhat elongated notches 16 in the edges of the underlying plate 12. Obviously the depending elements 15 may be bent beneath the plate 12 and by this arrangement the plate 13 is guided when slid over the plate 12.

The plate 13, at the corner thereof opposite that which contacts with the front portion of the casing is formed with an extending finger 16' and inward of the finger with a notch 17. The extension 16' is bent upwardly and has screwed through an opening therein a rod 18 which has screwed thereon nuts which contact with the opposite faces of the finger 16'. The second end of the rod is formed with an eye to engage with the crank portion 19 on the lower end of a substantially U-shaped member or bail 20. The lower element of the bail is journaled in suitable bearings 21 secured to the inner face of the rear wall of the casing.

Designed to be normally received in and to contact with the inner wall provided by the notch 17 there is the offset end 22 of a trip rod 23. By reference to Figure 4 of the drawings it will be seen that the overlying plate 13 is of a less length than the underlying plate 12, and the underlying plate is provided with bearings 24 for the trip rod. The trip rod, adjacent to one of its ends, is formed with a finger 24' that is engaged by a spring 29 which is attached to a downwardly inclined chute 26 that is suitably secured in the arched rear portion of the casing. The chute is designed to have inserted therein disk locking elements. The arched top portion 5 is provided with a disk inlet 27 which, of course, communicates with the chute. The trip element is provided with a lip 28 that is arranged in a line with the outlet 30 at the lower end of the chute, and hingedly secured to the chute, upon what I will term the inner face thereof, directly above its outlet opening there is a gravity influenced cross sectionally L-shaped gate 31. The plate 13 carries at its free edge a hammer element 32 that is movable through the disk outlet opening 30 when brought opposite a disk in the said opening. By reference to Figure 5 of the drawings it will be seen that the locking disk, indicated for distinction by the numeral 33, has its upper edge wholly received in the opening and that its lower edge is engaged by the lip 28 on the trip member 23. This offers an obstruction to the hammer, but will permit the same moving through the disk opening and after being brought against the disk, the same will by virtue of such contact with the lip 28 swing the trip member to bring its end 22 out of engagement with the wall provided by the notch 17 and thereby allow of the slidable plate 13 moving over the plate 12, when the device is actuated in a manner which will presently be described.

Having an offset portion or foot which is fixedly secured to the base there is an upstanding rod or handle 34 that passes through a round opening in the fixed plate 12, through an elongated opening in the movable plate 13 and likewise projects through the top of the front portion 7 of the housing.

Having its end fulcrumed, as at 35, in the base there is a second rod or handle 36 which passes through an elongated opening in the plate 12 and through a round opening in the plate 13, as well as through an elongated opening in the front portion of top of the casing. On this rod and overlying the plate 13 there is preferably arranged a cover plate 37 which closes the elongated opening in the top of the front portion 7 of the casing. The fulcrum 35 is held in its bearing through the medium of a pin 38 that passes transversely through the bar 36 and underlies the fixed plate 12.

Preferably secured between the rods or handles 34 and 36, which it should be stated are arranged one to the rear of the other, there is a strong double arm or U-shaped spring 39. The arms of this spring have their ends offset and are received in notches in the confronting faces of the respective handles 34 and 36.

As far as the description has progressed it will be apparent that a coin must be deposited in the coin chute before the handle 36 can be moved in the direction of the fixed handle 34, the movement of the handle 36 will cause the plate 13 to slide over the plate or shelf 12 and the said handle 36 is permitted a sufficient movement to bring the hammer on the plate 13 into contact with the coin 33 to swing the trigger 23 to bring its end 22 out of engagement with the edge provided by the notch 17.

Brace means, similar to the adjustable rods 8 and 10 are arranged between the sides at the arcuate top 5 and the base 1 as disclosed by the drawings and broadly indicated by the numerals 41.

Having one of its ends fixedly secured to the arched plate or shelf 12 and its second end fixed to the back 4 of the casing there is an arched or curved plate 42. This plate has pivotally secured thereto at equidistant points spaced fingers 43, the other ends of the fingers being pivoted to a second curved plate 44. One of the fingers 43 projects beyond the plate 44 and through a slot 45 in the top 5, and to this finger there is fixed an element 46 shaped to represent a goat in motion, and the horns of this figure are designed to contact with a bell 47 that is also fixed on the top 5.

One of the arms of the U-shaped member or bail 20 is indicated for distinction by the numeral 47 and has pivotally secured thereto, as at 48, the body portion of a tappet 49. The body of the tappet is held in contact and in longitudinal alinement with the arm 47 through the medium of a spring 50. The tappet 48 is in the path of contact with the fingers 43 and it will be apparent that by virtue of such contact the fingers will be swung to move the plate 44 toward the rear or back 4 of the casing. Connected between the plate 44 and an arched supporting plate 51 there is a spring 52 which is expanded when the fingers are swung as just described and which is contracted after the tappet passes over the fingers so as to bring the element 46 into contact with the bell 47 and consequently sound the bell after each of the fingers 43 have been swung or thrown.

The arched top 5 of the improvement, at one side of the bell or alarm 47 is provided with an opening that is surrounded by a frame 53. The frame 53 also contacts with a transparent plate, and between the transparent plate and the arched top 5 of the casing there is fixed a scale bearing plate 54. The plate 54 is provided with a central slot or opening 55 and there is designed to travel over this degree plate 54 a finger 56 which is removably fixed on the second arm 57 of the bail 20. The indicator plate, at one side of the opening, is inscribed with suitable indicia to indicate a weak grip, a medium grip, a strong grip, a very strong grip and a super-strong grip, the other side of the plate having degree marks to indicate the gripping strength of the user of the improvement.

As previously stated a coin is deposited in the coin chute and when the handle 36 is gripped and moved toward the fixed handle or rod 34 this coin will be canted and thrown out of the coin slot 30 in the chute 26 so as to swing the trip member 23 to bring its end 22 out of contact with the shoulder 17 in the slidable plate 13, the slidable plate being moved by the swinging of the member 36 in the direction of the fixed member 34. This causes the plate 13 to slide over the fixed plate or shelf 12 and causes the element 18 to swing the U-shaped member or bail 20 so that as the tappet contacts with the fingers 43, they will, as previously described, cause the element 46 to successively contact with the bell 47 and sound an alarm. The fingers are so arranged that the bell will be sounded when the indicator finger 56 is brought opposite each indicia 58 on the scale 54. The spring 39, as stated, is of a comparatively great strength but is regulated to accord with the swinging of the U-shaped member or bail 20 and with the improvement the grip of a person can be accurately tested. Obviously when no coin is received in the coin chute to contact with the lip 28 of the trip member 23, the latter cannot be swung, so that it is impossible to move the handle 36 toward the handle 34 until such coin is received through the chute to engage with the said lip.

The improvement is comparatively simple and the construction and advantages thereof will, it is thought, be perfectly apparent and appreciated when the foregoing description has been carefully read in connection with the accompanying drawings.

Having described the invention, I claim:

In a grip testing machine, a casing having a fixed handle and a movable handle which is spring influenced away from the fixed handle, a plate carried by the movable handle, a substantially U-shaped bail journaled in the casing for rotation and having a cranked portion, adjustable means connecting the plate with the said cranked portion, a pivotally supported spring influenced detent on one of the arms of the bail, a fixed plate in the casing, fingers pivoted to said fixed plate in the path of contact with the detent, one of said fingers being longer than the remaining fingers and carrying a contact element, a bell on the casing engageable with said element, a movable spring influenced plate to which the fingers are pivoted, said casing carrying a scale, and a finger carried by the second arm of the bail and movable over the scale as the bail is rotated when the movable handle is swung toward the stationary handle to impart a sliding movement to the plate on said movable handle.

In testimony whereof I affix my signature.

GEORGE MONROE RAMSEY.